(12) United States Patent
Blumenthal-Barby et al.

(10) Patent No.: US 9,807,169 B2
(45) Date of Patent: Oct. 31, 2017

(54) DISTRIBUTED TAGGING OF DATA IN A HYBRID CLOUD ENVIRONMENT

(71) Applicant: SAP SE, Walldorf (DE)

(72) Inventors: David Blumenthal-Barby, Berlin (DE); Philipp Herzig, Berlin (DE); Sander Wozniak, Potsdam (DE); Ingo Brenckmann, Potsdam (DE)

(73) Assignee: SAP SE, Walldorf (DE)

( * ) Notice: Subject to any disclaimer, the term of this patent is extended or adjusted under 35 U.S.C. 154(b) by 193 days.

(21) Appl. No.: 14/703,519

(22) Filed: May 4, 2015

(65) Prior Publication Data

US 2016/0330280 A1    Nov. 10, 2016

(51) Int. Cl.
  *H04L 29/08* (2006.01)
  *G06F 17/30* (2006.01)

(52) U.S. Cl.
  CPC ...... *H04L 67/1097* (2013.01); *G06F 17/3056* (2013.01); *G06F 17/30371* (2013.01); *G06F 17/30504* (2013.01); *G06F 17/30598* (2013.01)

(58) Field of Classification Search
  CPC .................................................. H04L 67/1097
  USPC .......................................................... 709/219
  See application file for complete search history.

(56) References Cited

U.S. PATENT DOCUMENTS

| | | | | |
|---|---|---|---|---|
| 4,989,141 A | | 1/1991 | Lyons et al. | |
| 5,530,824 A | * | 6/1996 | Peng | G06F 12/1027 365/189.02 |
| 5,778,370 A | * | 7/1998 | Emerson | G06F 17/30289 |
| 5,793,663 A | * | 8/1998 | Ng | G11C 7/1027 365/189.05 |
| 5,895,463 A | * | 4/1999 | Dowling | G06F 17/2735 |
| 6,704,739 B2 | * | 3/2004 | Craft | G06F 17/30398 |
| 6,862,655 B1 | * | 3/2005 | Podaima | G11C 15/00 365/49.15 |
| 6,901,403 B1 | * | 5/2005 | Bata | G06F 17/30572 |
| 7,085,781 B2 | * | 8/2006 | Crow | G06F 17/30067 707/823 |
| 7,565,613 B2 | | 7/2009 | Forney et al. | |

(Continued)

OTHER PUBLICATIONS

Merriam-Webster, "customize", 2017.*

(Continued)

*Primary Examiner* — O. C. Vostal
(74) *Attorney, Agent, or Firm* — Brake Hughes Bellermann LLP

(57) ABSTRACT

A system includes a first application and a storage layer running on a cloud computing device, where the first application includes a service layer to interface over a network with a browser application running on a client computing device to provide the browser application access to the first application and a tagging module to interface over a communication connector with a second application running on a remote computing device having a database. The service layer receives requests for data from the first application and provides the requested data from the database. The tagging module is configured to tag a record of the data in response to tag requests from the first application, where the record of the data is tagged by generating an item reference to the record to enable a customized view of the data. The storage layer is configured to store the item references.

20 Claims, 6 Drawing Sheets

(56) References Cited

U.S. PATENT DOCUMENTS

| | | | |
|---|---|---|---|
| 7,613,740 B2* | 11/2009 | Holenstein | G06F 17/30581 370/400 |
| 7,624,341 B2 | 11/2009 | Salmon et al. | |
| 7,630,996 B1* | 12/2009 | Hershkovich | H03M 7/30 |
| 7,653,638 B2 | 1/2010 | Forney et al. | |
| 8,280,896 B2 | 10/2012 | Chapé et al. | |
| 8,412,516 B2 | 4/2013 | Verma et al. | |
| 8,447,801 B1* | 5/2013 | Roche | G06F 17/30206 707/736 |
| 8,738,864 B2 | 5/2014 | Katzung et al. | |
| 8,786,433 B2 | 7/2014 | Grebner et al. | |
| 8,818,975 B2 | 8/2014 | Aigner et al. | |
| 8,983,894 B2* | 3/2015 | Cohen | G06F 17/30864 707/722 |
| 9,294,507 B1* | 3/2016 | Roth | H04L 63/20 |
| 2004/0039732 A1* | 2/2004 | Huang | G06F 17/3089 |
| 2004/0111220 A1* | 6/2004 | Ochs | G06K 9/624 702/19 |
| 2005/0234969 A1* | 10/2005 | Mamou | G06Q 10/10 |
| 2005/0280540 A1* | 12/2005 | Muehl | G06F 17/30389 340/572.4 |
| 2006/0259475 A1* | 11/2006 | Dehlinger | G06F 17/30997 |
| 2008/0034425 A1* | 2/2008 | Overcash | G06F 21/55 726/22 |
| 2009/0077091 A1* | 3/2009 | Khen | G06F 8/34 |
| 2009/0201730 A1* | 8/2009 | Lueng | G11C 11/404 365/185.08 |
| 2011/0106667 A1 | 5/2011 | Johnson et al. | |
| 2012/0054440 A1* | 3/2012 | Doig | G06F 17/30902 711/122 |
| 2012/0278282 A1* | 11/2012 | Lu | G06F 17/30575 707/634 |
| 2013/0046922 A1* | 2/2013 | Pan | G06F 17/3033 711/104 |
| 2013/0211555 A1 | 8/2013 | Lawson et al. | |
| 2013/0218981 A1 | 8/2013 | Kohlhaas et al. | |
| 2013/0238856 A1* | 9/2013 | Loh | G06F 12/0864 711/118 |
| 2013/0339471 A1* | 12/2013 | Bhargava | G06F 17/30581 709/213 |
| 2014/0156806 A1* | 6/2014 | Karpistsenko | G06Q 50/28 709/219 |
| 2014/0245116 A1* | 8/2014 | Dangerfield | G06T 11/80 715/202 |
| 2015/0039558 A1* | 2/2015 | Yamada | G06F 17/30289 707/623 |
| 2015/0120687 A1* | 4/2015 | Bhattacharjee | G06F 17/30362 707/704 |
| 2015/0186025 A1* | 7/2015 | Anderson | G06Q 10/101 715/747 |
| 2015/0205830 A1* | 7/2015 | Bastide | G06F 17/30386 707/758 |
| 2015/0220636 A1* | 8/2015 | Deen | H04N 21/222 707/740 |
| 2015/0254370 A1* | 9/2015 | Sexton | G06F 17/30958 707/798 |
| 2015/0278327 A1* | 10/2015 | Raghavan | G06F 17/30339 707/615 |
| 2016/0078022 A1* | 3/2016 | Lisuk | G06F 3/04842 706/12 |
| 2016/0196290 A1* | 7/2016 | Lyle | G06F 17/30321 707/741 |
| 2016/0267147 A1* | 9/2016 | Seemann | G06F 17/30551 |
| 2016/0306709 A1* | 10/2016 | Shaull | G06F 11/1458 |

OTHER PUBLICATIONS

Rouse, "hybrid cloud", 2017.*

Rom, A. and C. Rohde. "Management accounting and integrated information systems: Literature review: the findings". PhD School of Economics and Business Administration, Copenhagen Business School, PhD Series 5, 2008, 35 pages.

Chenhall, R.H. and D. Smith. "A review of Australian Management accounting research 1980-2009". Accounting & Finance, 51(1), 2011, pp. 173-206.

Granlund, M. "Extending AIS research to management accounting and control issues: A research note". International Journal of Accounting Information. Systems, 12(1), 2011, pp. 3-19.

Seethamraju, R. "Barriers to the Adoption of Management Accounting (MA) Processes in Enterprise Resource Planning (ERP) Environments". HICSS'48, 2015, pp. 4201-4210.

Nittler, M. "Tales of the Cloud: The Story of Worktags." downloaded from http://blogs.workday.com/story-of-worktags/, Nov. 5, 2012, 3 pages.

Harris, T. and S. Morsfield. "An Evaluation of the Current State and Future of XBRL and Interactive Data for Investors and Analysts." Columbia Business School, Center for Excellence in Accounting & Security Analysis, White Paper No. 3, Dec. 2012, 73 Pages.

* cited by examiner

US 9,807,169 B2

DISTRIBUTED TAGGING OF DATA IN A HYBRID CLOUD ENVIRONMENT

TECHNICAL FIELD

This description relates to the distributed tagging of data in hybrid cloud environment.

BACKGROUND

Businesses may use accounting systems, including financial enterprise resource planning (ERP) systems, primarily for compliance purposes (e.g., International Financial Reporting Standards (IFRS), United States-Generally Accepted Accounting Principles (US-GAAP)) and rarely make use of management accounting modules for performance or profitability. A deeper analysis indicates adoption barriers in such environments. These include, for example, complicated system landscapes, as well as complex and expensive customization projects that suggest a wrong degree of flexibility, inadequate reporting capabilities, or lack of knowledge. Due to these reasons, management accounting and reporting mainly takes places using spreadsheets rather than in the financial ERP systems directly, with controllers or accountants manually pulling data from the financial system into spreadsheets for further processing. However, spreadsheets have a long list of shortcomings, such as missing data integrity, inconsistent master data, or inadequate sharing and comparing capabilities. The widespread use of spreadsheets may cause severe reporting and data integrity problems in companies.

Financial ERP systems may be powerful and adequate: for capturing massive amounts of business data and for defining strict models that can be used company-wide to report in a compliant, legally binding, and consistent manner. However, for management accounting purposes, individuals need to impose their own structures on the ERP data in a flexible manner, e.g., by splitting up data among projects, employees, individual cost categories, etc. What may be desired is to model, in a sense, an individual's own business view or "business reality". Here, the classic ERP model may be too rigid, strict, and inflexible. For these reasons, businesses use spreadsheets to accomplish tasks where the ERP model falls short.

SUMMARY

According to one general aspect, a system for tagging data includes at least one memory including instructions on a cloud computing device and at least one processor on the cloud computing device, where the processor is operably coupled to the at least one memory and is arranged and configured to execute the instructions that, when executed, cause the processor to implement a first application and a storage layer running on the cloud computing device. The first application includes a service layer that is configured to interface over a network with a browser application running on a client computing device to provide the browser application access to the first application and a tagging module configured to interface over a communication connector with a second application running on a remote computing device, the second application being configured to process data stored in a database on the remote computing device. the service layer receives requests for the data from the first application via the browser application running on the client device and provides the requested data from the database on the remote computing device. The tagging module is configured to tag a record of the data in response to tag requests from the first application via the browser application, where the record of the data is tagged by generating an item reference to the record to enable a customized view of the data using the tagged data. The storage layer is configured to store the item references.

In another general aspect, a computer-implemented method for tagging data includes executing instructions stored on a non-transitory computer-readable storage medium. The method includes interfacing over a network with a browser application running on a client computing device to provide the browser application access to a first application running on a cloud computing device and interfacing over a communication connector with a second application running on a remote computing device, where the second application is configured to process data stored in a database on the remote computing device. In response to receiving a tag request from the first application on the client device to tag a record in a database, the method includes creating an item reference to the record to enable a customized view of the data using the tagged data and storing the item references in a storage layer on the cloud computing device.

In another general aspect, a computer program product for tagging data is tangibly embodied on a non-transitory computer-readable storage medium and includes instructions that, when executed by at least one computing device, are configured to cause the at least one computing device to interface over a network with a browser application running on a client computing device to provide the browser application access to a first application running on a cloud computing device and interface over a communication connector with a second application running on a remote computing device, where the second application is configured to process data stored in a database on the remote computing device. In response to receiving a tag request from the first application on the client device to tag a record in a database, an item reference to the record is created to enable a customized view of the data using the tagged data and the item reference is stores in a storage layer on the cloud computing device.

The details of one or more implementations are set forth in the accompanying drawings and the description below. Other features will be apparent from the description and drawings, and from the claims.

DETAILED DESCRIPTION

This document describes a system and techniques for tagging data to create customized views of the data using a hybrid architecture to maintain the integrity of the data. For example, data may be stored and organized on a computing device using an application and a database. It may be desirable to maintain the integrity of the data in the database without allowing users to directly customize and change the data on the database. A separate computing device (e.g., a cloud-based computing device) may be used to create and store tags, where the tags are used to enhance a specified record (or row of data) or a number of specified records (or rows of data) in the database in order to create customized views of the data without manipulating the actual data in the database. The tags are stored on a separate system from the data in the database and the tags are associated with item references (or pointers) to the specific record or records in the database. In this manner, the customized views of the data may be created using the tags without having to copy or replicate the data on the separate computing device.

Many different tags and groups of tags may be created by many different users. In this manner, many users may create customized views of the existing data using the tags. The customized views may be shared and modified by the users, again without actually changing or inserting the tags into the actual data stored in the database and without having to copy or replicate the data on the separate computing device.

Figure 1:
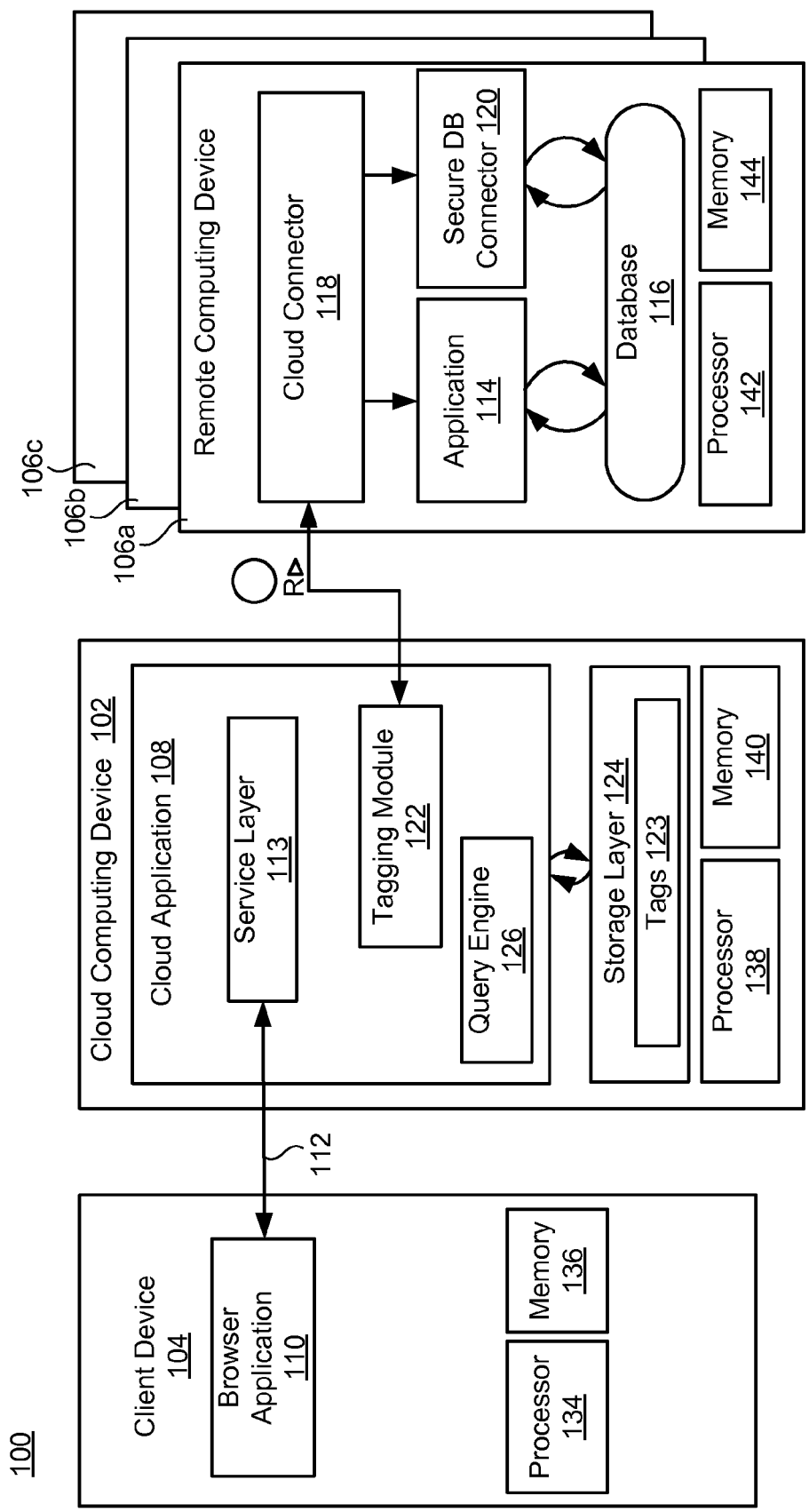
FIG. 1 is a block diagram of a system for tagging data using a hybrid architecture.

FIG. 1 is a block diagram of a system 100 for tagging data using a hybrid architecture. The system 100 includes a cloud computing device 102, a client device 104 and multiple remote computing devices 106a-106c. The cloud computing device 102 includes a cloud application 108, which may be accessed by the client device 104 using a browser application 110 over a network 112. The cloud application 108 includes a service layer 113, which is an interface between the cloud computing device 102 and the browser application 110 running on the client computing device 104.

The cloud application 108 may be a cloud-based application that resides on the cloud computing device 102, but that is accessible for use by the client device 104 using the browser application 110. One or more aspects of the cloud application 108 may be presented on a user interface within the browser application 110 as a web-based front end. While the client device 104 may use a browser application 110 to access and use the cloud application 108, it is understood that other applications on the client device other than a browser application may be used to access and use the cloud application 108 over the network 112.

The cloud application 108 running on the cloud computing device 102 also may access other applications and data that are running and stored on one of the remote computing devices 106a-106c. In some example implementations, the remote computing devices 106a-106c may include an enterprise resource planning (ERP) system, a customer relationship management (CRM) system or other application system running on premise in a remote customer landscape. For example, the remote computing device 106a includes an application 114, where the application 114 accesses and processes data stored in the database 116. The cloud application 108 may request and access the application 114 and the data stored in the database 116 through the cloud connector 118 and the secure database (DB) connector 120. The cloud connector 118 provides a secure communication channel between the remote computing device 106a and the cloud computing device 102 using a secure communication protocol such as, for example, hypertext transfer protocol secure (HTTPS) or a virtual private network (VPN). The secure DB connector 120 (also referred to as a business connector) provides a secure communication interface with the database 116.

The cloud application 108 may deliver the requested data from the application 114 and the database 116 stored on the remote computing device 106a to the client device 104 for rendering and display in the cloud application 108 running in the browser application 110. The data communication from the application 114 and the database 116 is not stored in the cloud application 108 and its related components, but instead is transient. In this manner, the client device 104 may access the data in the database 116 stored on the remote computing device 106a through the cloud application 108 running on the cloud computing device 102.

A user of the client device 104 may desire to modify the data from the database 116 being presented on the client device 104 through the cloud application 108 running on the browser application 110. However, it may also be desirable to maintain the integrity of the data in the database 116 and not allow individual users to make direct changes to the data in the database 116. That is, the application 114 and the data in the database 116 may be a closed system that allows access to and viewing of the data, but it may be difficult to change the data in the database 116 such that the data may only be changed through the application 114, where application 114 complies with the legal constraints or other processes defined and governed by the data owner (e.g., company or business). It has been found that changing the processes and the application 114 is rigid in order to make changes to the underlying data in the database 116. The accessed data may be analyzed and manipulated but without modifying the underlying data. For example, the user accessing the data in the closed system is prohibited from adding columns to the database or deleting data from the database or otherwise changing the data. If an individual user on a client device were allowed to make direct changes to the data, then those changes would affect the viewing and analyzing of the data by other users.

To enable a user on the client device 104 to organize and model the data as a customized view, the cloud application 108 includes a tagging module 122. The tagging module 122 enables a user of the client device 104 accessing the cloud application 108 through the browser application 110 to tag a specific record or specific records of the database 116 such that those tagged records can be used to model the data in a customized manner. In other example implementation, a tag may be an entity having data or metadata associated with it based on a particular domain. For instance, in one example implementation, a tag may be a string label attached to an entity (e.g., a record or row of a database). In other domains such as a financial application domain, a tag may have cost-splitting, planning or cost distribution information associated with the tag. In this case, the tag's string label may be used as an identifier.

The user may create and save a tag group. The tag group may be independent from tagged records and may include tags that haven't been assigned to records yet. The tag group may define a reporting dimension.

The tagging module 122 is part of the cloud computing device 102 and the tags 123 that are created in response to a user tagging the data are stored in a storage layer 124. The data in the database 116 on the remote computing device 106a does not change at all even when tags are applied to the data because the tags and tag groups are implemented on the cloud computing device 102 independent of the data in the database 116.

In order to attach a tag to the data in the database 116, an item reference is created and associated with the particular record or row of data in the database 116. The item reference is stored in the storage layer 124. A tag may be created independent of an item reference. The item reference is created and used to attach the tag to a database record.

In one implementation, tags enhance the transactional data from the application 114 and the database 116 with new characteristics. In other implementations, the tags may override the transactional data from the application and the database 116 in the situations where a tag is assigned to an existing field of the database 116. In the various implementations and uses of the tags, the tags allow the user to model their own views of the data and to share those views with other users without disturbing or modifying the database 116. The created tags 123 can be used for filtering and reporting using user-specific characteristics that are not otherwise available through the application 114 and the database 116.

The tags 123 enable comprehensive simulations of the data by allowing users to change values and characteristics of existing data on the fly and evaluate the effects of these changes on generated reports of the data. By replicating characteristics of the data as tags and manipulating those tags, simulations and what-if scenarios can also be run on the data. Since the tags are implemented and stored on the cloud computing device 102, functionality is essentially added to the application 114 and the database 116 without actually modifying or disturbing the application 114 and the database 116. In this manner, the tags 123 as implemented by the tagging module 122 in the cloud application 108 are done in a non-intrusive and non-replicating manner.

For instance, the tagging service is non-intrusive because it is fully based on the cloud computing device 102 so the tagging service does not intrude or interfere with the application 114 and the database 116. The data generated by the tags and the logic to implement the tagging module 122 are all located on the cloud computing device 102 and not on the remote computing device 106a. The tagging service is non-replicating meaning that the tagging service does not persist copies of the data from the database 116 on the cloud computing device 102. While copies of the data from the database 116 are not persisted, the data may be cached or stored temporarily in transient memory for the life time of a technical session (such as an HTTP session) such as for the time that the user is logged on during the session. This may be desirable because the data in the database 116 may be sensitive data (e.g., financial and accounting data for a business) and the owners of the data may not want the data to be copied and stored in other locations. Thus, the data remains in the database 116 on the remote computing device 106a.

The tagging module 122 enables users on the client device 104 to model the data without having to download the data to a spreadsheet. Traditionally, if a user wanted to manipulate the data and model the data in ways beyond what the application 114 would allow, the user would have to download and populate a spreadsheet with the data. Now, with the tagging module 122 that process is no longer necessary because the users can tag the data in any way they want and model the data using the tags. The tags are used to personally and individually create an adapted model of the data without downloading the data to a separate spreadsheet and without modifying the underlying data.

The cloud application 108 provides the user on the client device 104 with a user interface to the cloud application 108 through the browser application 110. The cloud application 108, using the tagging module 122, accesses the underlying data on the database 116 and presents the data to the user in the user interface. The user interface enables the user to select specific items of data and to virtually add one or more new columns to the data by defining tag groups. The tags are values of a row in a column (or tag group). For example, the user may define and label a group of tags and then tag line items of data to add to the defined group.

The tagging module 122 creates an item reference for the tagged data and saves the item reference as a tag 123 in the storage layer 124. In one implementation, the storage layer 124 is an in-memory database. The in-memory database may be a multi-tenant, in-memory database that enables multiple client devices 104 and multiple remote computing devices 106a-106c to use the single multi-tenant, in-memory database running on the cloud computing device 102.

The cloud application 108 includes a query engine 126. The query engine 126 enables the user on the client device 104 to search for and obtained both tagged and untagged data, where the item references for the tagged data are stored in the storage layer 124 on the cloud computing device 102 and all of the data, both the tagged data and the untagged data, is stored in the database 116 on the remote computing device 106a. The query engine 126 is configured to receive a query through the cloud application 108 being accessed through the browser application 110. If the query contains a request for tagged information, then the query engine 126 splits the query. The query engine 126 splits the query into a first part to obtain the item references for the tagged data and into a second part to obtain the data from the database 116. The item references point to the data in the database 116 that has been tagged. The query engine 126 joins the results of the split query and provides the joined results (e.g., serialized results) to the cloud application 108 running in the browser application 110 on the client device 104.

The client device 104 may include at least one processor 134 and at least one memory 136, where the memory 136 may be a non-transitory computer-readable storage medium. Thus, the at least one processor 134 may represent two or more processors executing in parallel, and a non-transitory computer-readable storage medium 136 may represent virtually any non-transitory medium that may be used to store instructions for executing the components of the client device 104. Multiple processors also may be referred to as multi-core processors or multi-processor core environment. The processor 134 may be a hardware processor, including a micro-processor. The at least one processor 134 may be configured to execute instructions stored on the computer-readable storage medium 136 that, when executed, cause the at least one processor 134 to implement the browser application 110.

The cloud computing device 102 includes at least one processor 138 and at least one memory 140, where the memory 140 may be a non-transitory computer-readable storage medium. Thus, the at least one processor 138 may represent two or more processors executing in parallel, and a non-transitory computer-readable storage medium 140 may represent virtually any non-transitory medium that may be used to store instructions for executing the components of the cloud computing device 102. Multiple processors also may be referred to as multi-core processors or multi-processor core environment. The processor 138 may be a hardware processor, including a micro-processor. The at least one processor 138 may be configured to execute instructions stored on the computer-readable storage medium 140 that, when executed, cause the at least one processor 138 to implement the cloud application 108, the service layer 113, the tagging module 122, the query engine 126 and the storage layer 124.

The remote computing device 106a includes at least one processor 142 and at least one memory 144, where the memory 144 may be a non-transitory computer-readable storage medium. Thus, the at least one processor 142 may represent two or more processors executing in parallel, and a non-transitory computer-readable storage medium 144 may represent virtually any non-transitory medium that may be used to store instructions for executing the components of the remote computing device 106a. Multiple processors also may be referred to as multi-core processors or multi-processor core environment. The processor 142 may be a hardware processor, including a micro-processor. The at least one processor 142 may be configured to execute instructions stored on the computer-readable storage medium 144 that, when executed, cause the at least one processor 142 to implement the cloud connector 118, the application 114, the secure database connector 120 and the database 116.

Figure 2:
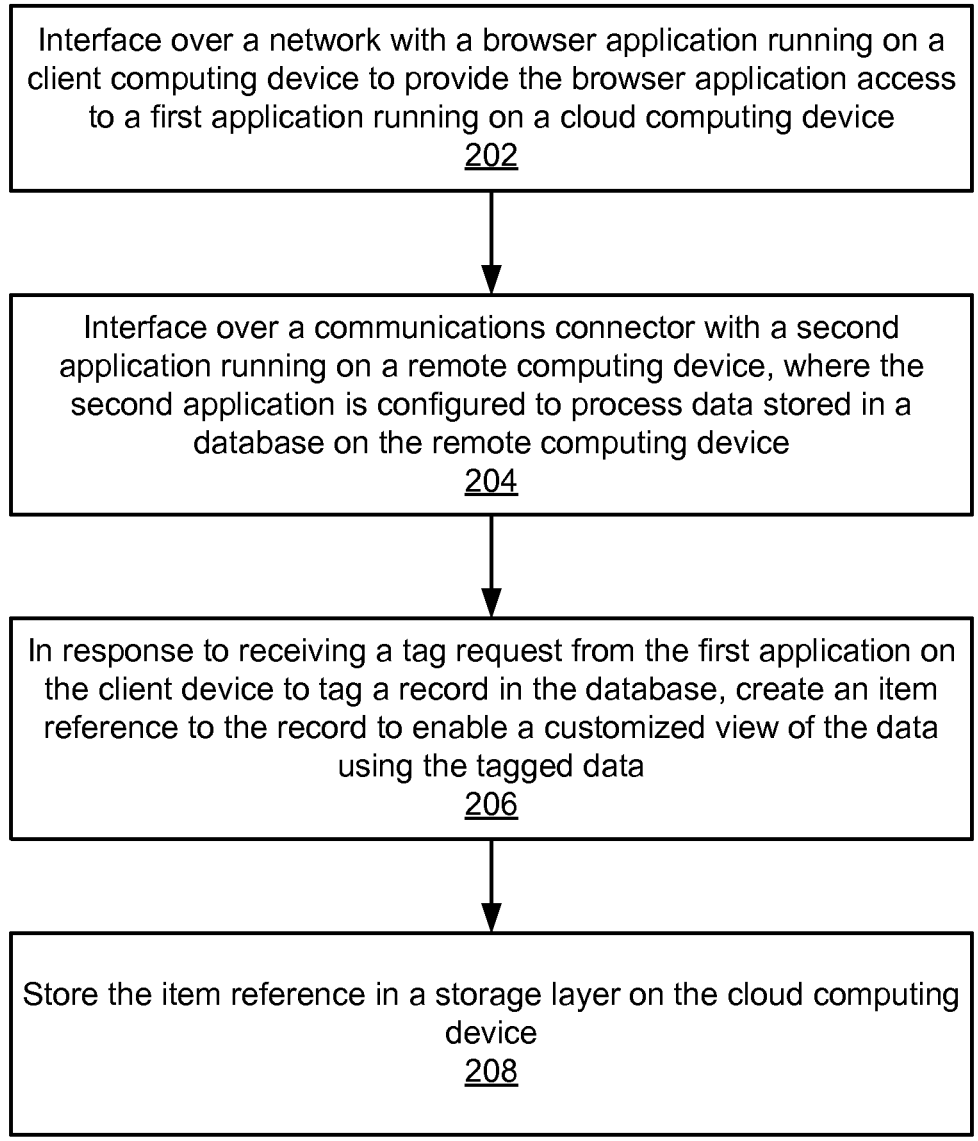
FIG. 2 is a flowchart illustrating example operations of the system of FIG. 1.

FIG. 2 is an example flowchart an example process 200 for operations of the system 100 of FIG. 1. Process 200 includes interfacing over a network with a browser application running on a client computing device to provide the browser application access to a first application running on a cloud computing device (202). For example, with respect to FIG. 1, the service layer 113 is configured to interface over the network 112 with the browser application 110 running on the client computing device 104. The service layer 113 provides the browser application 110 access to the cloud application 108, which is running on the cloud computing device 102.

Process 200 includes interfacing over a communications connector with a second application running on a remote computing device, where the second application is configured to process data stored in a database on the remote computing device (204). For example, the tagging module 122 is configured to interface with the cloud connector 118 with the application 114 running on the remote computing device 106a. The application 114 is configured to process data stored in the database 116 on the remote computing device 106a.

Process 200 includes in response to receiving a tag request from the first application on the client device to tag a record in the database, creating an item reference to the record to enable a customized view of the data using the tagged data (206). For example, the tagging module 122 may receive a tag request from the cloud application 108 being accessed by the browser application 110 to tag a record in the database 116. The tagging module 122 may create an item reference to the record to enable the customized view of the data using the tagged data.

Process 200 includes storing the item reference in a storage layer on the cloud computing device (208). For example, the item reference is stored in the storage layer 124 on the cloud computing device 102.

Figure 3:
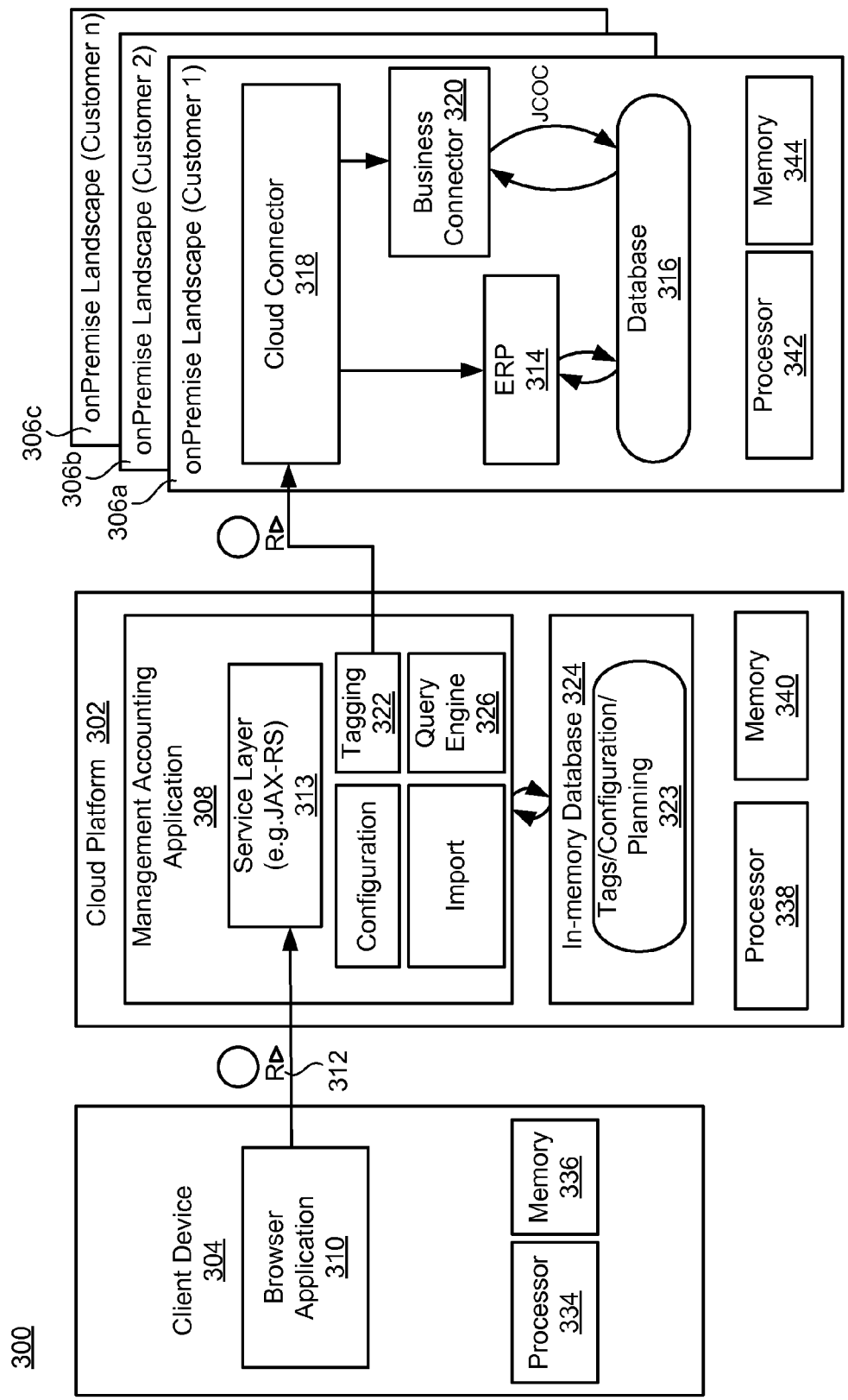
FIG. 3 is a block diagram of an example of the system 100 of FIG. 1 in a context of an accounting management system.

FIG. 3 is a block diagram of an example of the system 100 of FIG. 1 in a context of an accounting management system. In FIG. 3, system 300 includes a cloud platform 302, a client device 304 and multiple remote computing devices 306a-306c, which are referred to in the figure as onPremise landscapes for different customers. The onPremise landscapes 306a-306c each may include a cloud connector 318 to the cloud platform 302, a secure business connector 320, an enterprise resource planning (ERP) application 314 and a database 316 to store the data for the ERP application 314. The ERP application 314 and the corresponding data stored in the database 316 may include sensitive business financial and accounting data that are used for business accounting purposes.

As discussed above with respect to FIG. 1, the cloud platform 302 includes an application having a tagging module 322 that enables a user on the client device 304 to model the data from the ERP application 314 without making changes to the underlying data stored in the database 316. The management accounting application 308 is accessed by the client device 304 using the browser application 310 over the network 312. The management accounting application 308 through the tagging module 322, the cloud connector 318 and the business connector 320 enable data from the database 316 to be presented to the client device 310.

Tags enhance the transactional (line item) data from the ERP (e.g., financial transactions from SAP ERP tables BSEG, COEP, or ACDOCA) with new characteristics. They allow users, in a lightweight manner, to model their own business views, as described above. This enables modeling with a straightforward user interaction scheme that is well known from websites and consumer software.

The additional characteristics provided by tags can be used for filtering and reporting over line items, using the user-specific characteristics that are not available in the ERP.

Tags enable comprehensive, yet lightweight simulations by changing values and characteristics of existing data on the fly and evaluating the effects of these changes on reporting results. By replicating characteristics of ERP data as tags and manipulating those, lightweight simulations and what-if scenarios can also be run on ERP data (e.g., changing the cost center in COEP and calculating the resulting changes).

A user (e.g., a manager) may retrieve the actuals (booked line items) and planned values from the on-premise system 306a. The numbers are visualized in a web-based front-end through the browser application 310 to compare actuals and plan. The manager may analyze the data based on existing dimensions of the line items, e.g., internal orders, cost center, or account. Now the manager wants to report on a project that is not modeled in the ERP system 314. Without tagging, this would require complex customization in the ERP 314. With tagging, the user can create, for example, a new tag "Project X", in the (also user-generated) tag group "Projects". Now the user has two ways of tagging line items belonging to this project. First, the user can use a filter function to search for the respective transactions/line items and add the tag to these line items. Secondly, the user may select employees that work on project X and tag them, i.e., instead of tagging line items directly, existing master data will be tagged. By the transitive relationship, all line items generated by the tagged employees will be tagged on a data level. After the tagging, the project characteristics and its values (i.e., projects) are added to the list of aggregation criteria, allowing the manager to report on the newly created project. This principle applies to arbitrary master data that is directly or indirectly associated with the financial transaction, i.e., also multiple transitive relationships can be tagged this way.

The browser application 310 may instantiate a portion management accounting application called a budget manager, which relies on the tagging module 322, and is an application, which resides on the cloud platform 302. In order to enable this distributed architecture, a query engine 326 is capable of dividing a structured query into query parts for the onPremise ERP 314 and parts for the cloud-based tagging system as stored in the in-memory database 324. The query engine 326 receives the query and issues the query parts against the respective systems, and the results are combined in the Management Accounting Platform in order to obtain the desired joint outcome.

The client device 304 includes at least one processor 334 and at least one memory 336, where the processor 334 and the memory 336 include the same features and functionality as the processor 134 and the memory 136 of FIG. 1. The cloud platform 302 includes at least one processor 338 and at least one memory 340, where the processor 338 and the memory 340 include the same features and functionality as the processor 138 and the memory 140 of FIG. 1. The onPremise landscape 306a includes at least one processor 342 and at least one memory 344, where the processor 342 and the memory 344 include the same features and functionality as the processor 142 and the memory 144 of FIG. 1.

Figure 4:
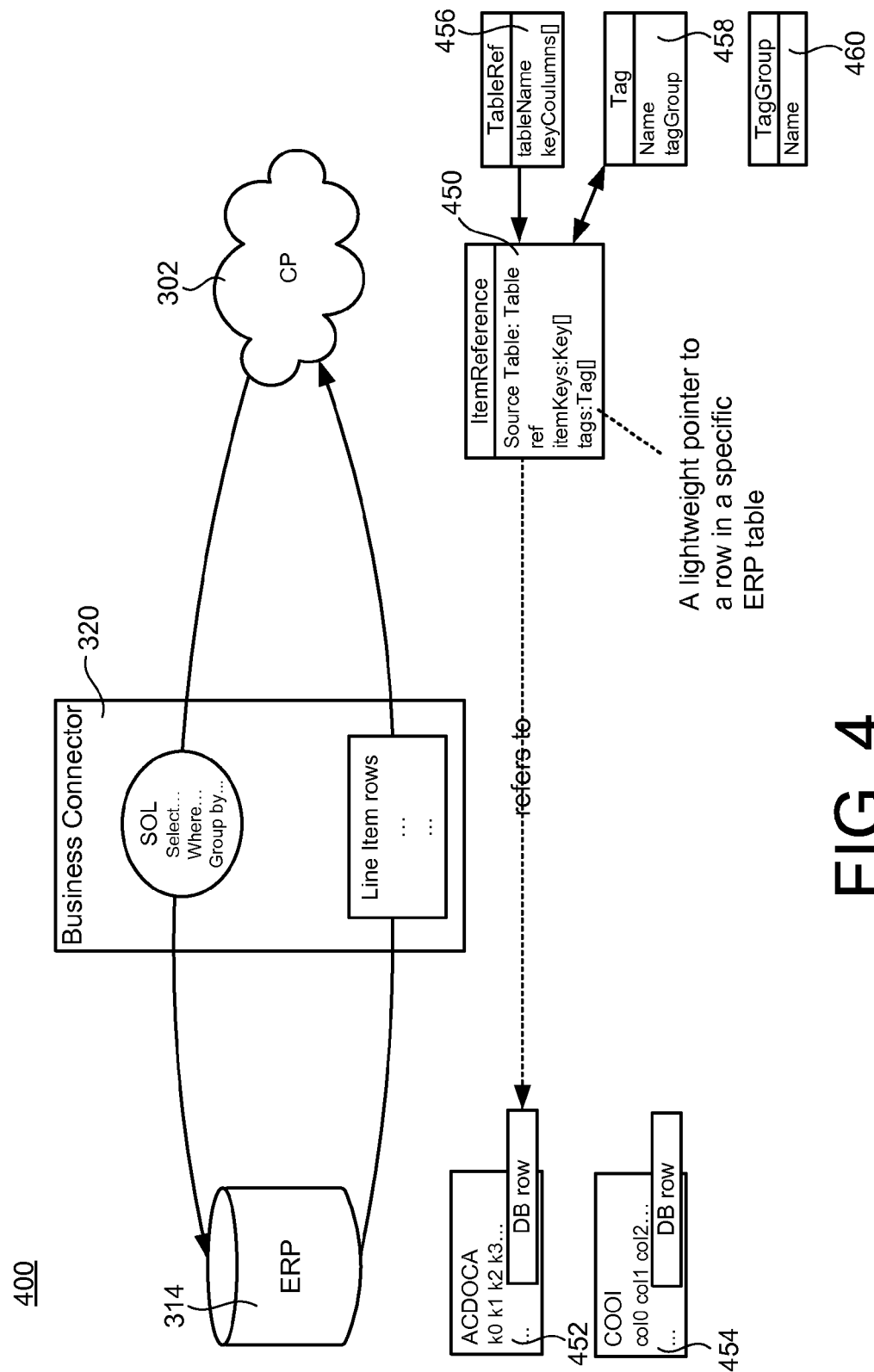
FIG. 4 is a block diagram illustrating the generation of the tags in a distributed model.

FIG. 4 is a block diagram 400 illustrating the generation of the tags in a distributed model. FIG. 4 shows the data model designed to enable these type of queries. Whenever a user applies a tag to a previously untagged line item, an item reference 450 is created which points to exactly one physical line item in the ERP 314. In the illustration, the user is tagging the ACDOCA table 452 containing actual costs but the principles applies to other line item tables, such as the COOI table 454 containing committed costs, as well. Furthermore, even non-financial tables, e.g., from the logistics module, might be tagged this way. The item reference 450 contains only the primary key required to realize the pointer to the ERP system 314, as well as the tagging information. The table reference 456 is a reference to the specific table in the database 316 and the tag includes the name of the tag group 460 to which the tag belongs. Multiple tags may be grouped together under the same tag group 460. No other ERP data is replicated. Note that the reference is only created and stored the first time a line item is accessed in the context of the Management Accounting Application 308.

Figure 5:
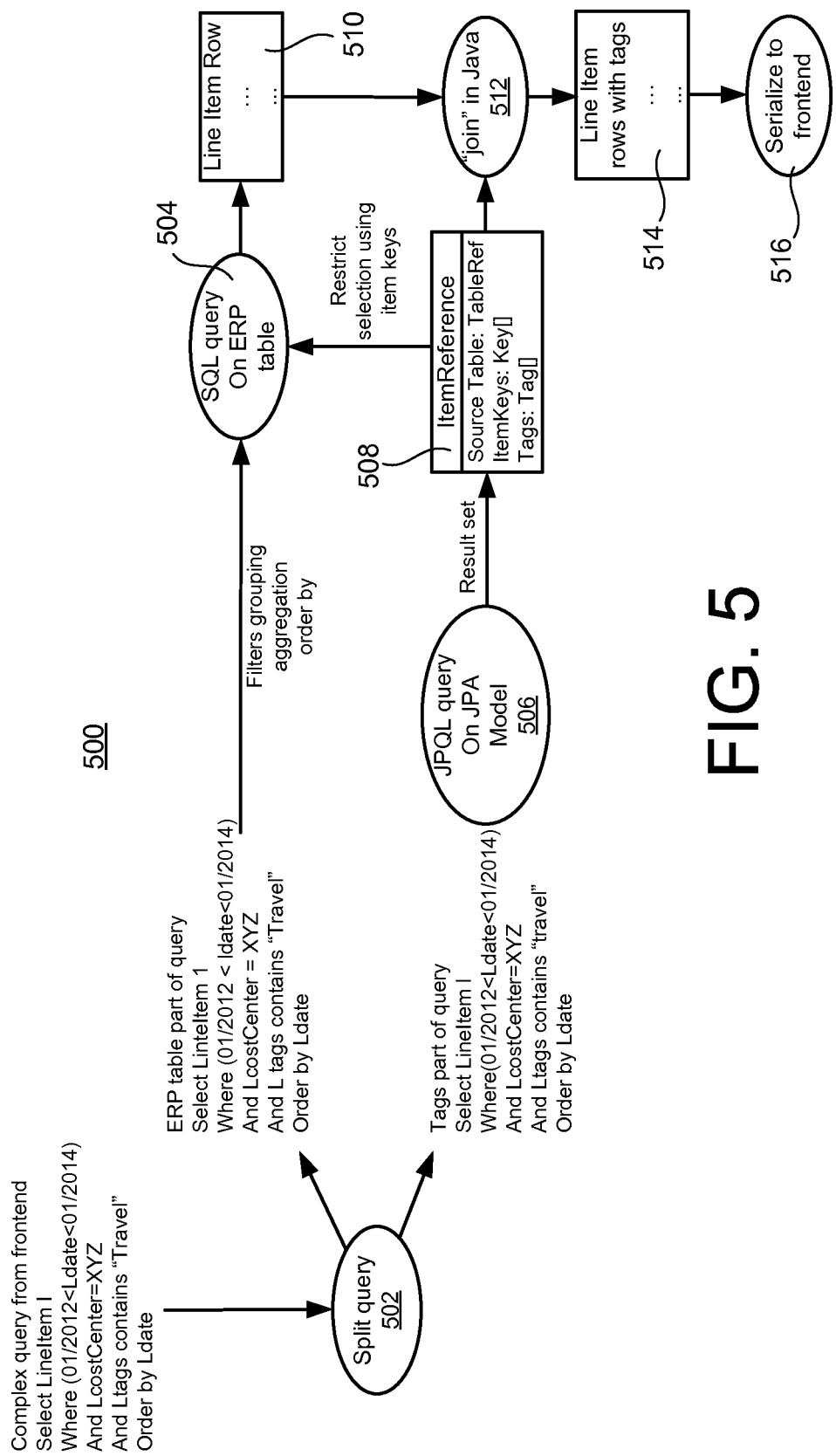
FIG. 5 is a block diagram illustrating a query from the client device as processed by a query engine.
Figure 6:
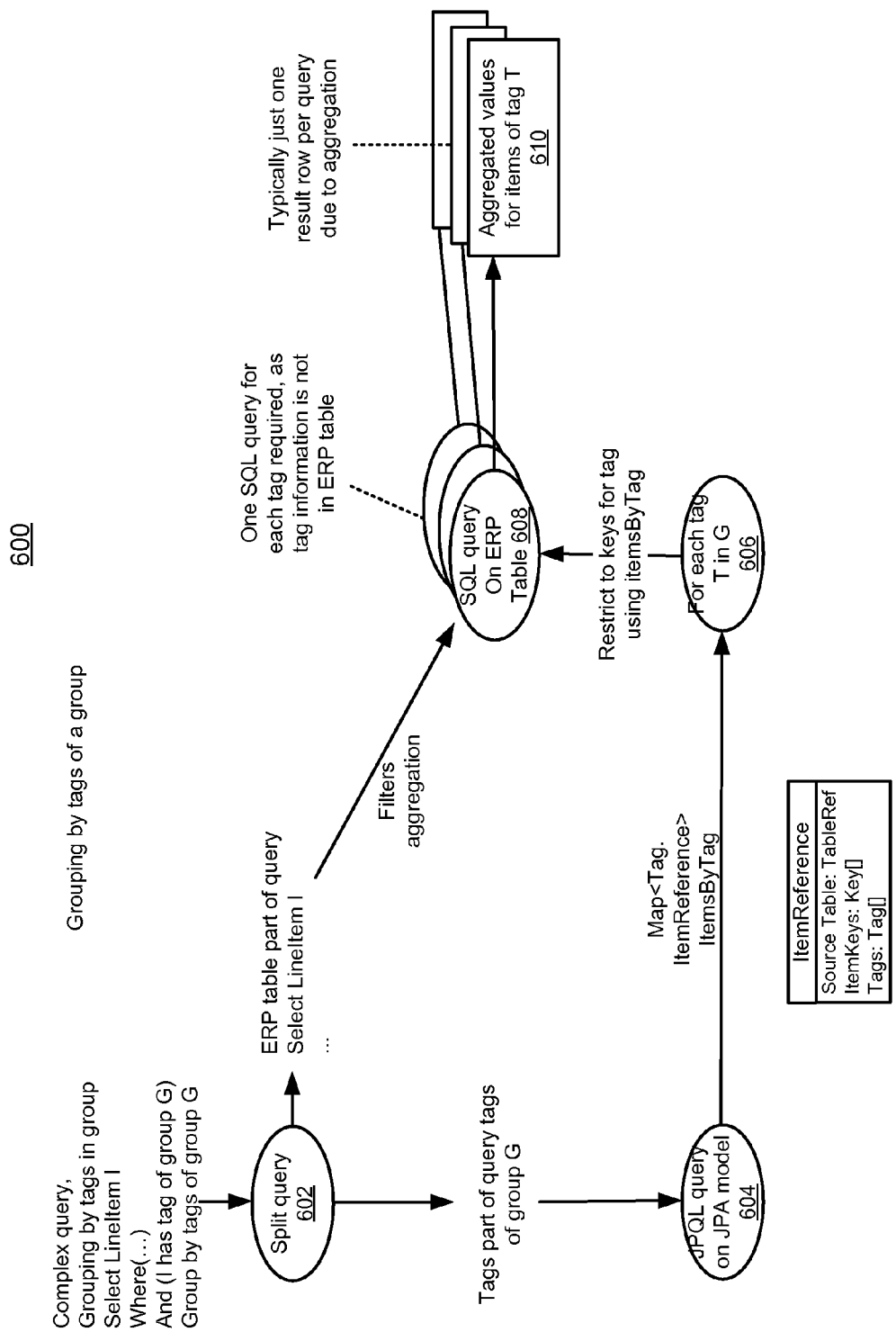
FIG. 6 is a block diagram illustrating a query for from the client device as processed by a query engine for an aggregation of tags.

FIGS. 5 and 6 are example queries that illustrate just two possible queries, namely a retrieving transaction query and an aggregate query, respectively. Many other types of queries are possible. The figures illustrate that a single query may be split into multiple, independent queries that are issued separately against respective portions of the system. The results of the independent queries are joined at a synchronization point (or sync point). While the figures may illustrate particular technologies, it is understood that the process and principles illustrated may be implemented using other technologies and that they are not limited to particular technologies.

FIG. 5 is a block diagram illustrating a query 500 from the client device as processed by a query engine. In a first step, the query 502 is split into two parts, 504 and 506. The tag-query 506, which is run against the tags and joined with the tagged line item references 508 that reside in the in-memory database 324. The ERP query 504, which is executed on the accounting system on the on-premise landscape 306a.

The tag query 506 yields a set of item references 508—the keys of line items for which the tagging conditions hold. These define a filter that is applied to the ERP query 504 before it is executed. Note that this filter cannot be formulated in terms of conditions (i.e., where-clauses) on the ERP query 504, as the tagging represents an individual and flexible structuring of the data that is not reflected by information in the ERP. Therefore, the tag-induced filter is an explicit listing of line item database keys. Finally, the result of the filtered ERP query 510 is joined 512 augmented with the tag information in the cloud platform, with the result 514 being sent out for further processing, such as being serialized to the client device on the front end 516.

FIG. 6 is a block diagram illustrating a query 600 from the client device as processed by a query engine for an aggregation of tags. FIG. 6. shows the query plan for grouping and aggregating data by tags of a specific group. Note that this query cannot be realized with a GROUP BY clause on the ERP query part since the tagging information is only available in the ERP system.

In the first step, the group-by clause is isolated from the query 602, transform it into a selection to retrieve the tags of the group 604, and issue it against the cloud system. The result of this query is a data structure that contains, for each tag within the group, the corresponding item references 606. In a second step, for each tag, an individual aggregating query comprising the ERP-directed part of the original query is issued against the on-premise system, filtering on the line items that belong to the respective tag 608. Thus, for a tag group with n tags, n queries will be issued against the on-premise system without further optimization. Finally, aggregation results of the n queries are combined with the tag information for further processing.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for tagging data, the system comprising:
at least one memory including instructions on a cloud computing device; and
at least one processor on the cloud computing device, wherein the processor is operably coupled to the at least one memory and is arranged and configured to execute the instructions that, when executed, cause the processor to implement:
a first application running on the cloud computing device, wherein the first application includes:
a service layer that is configured to interface over a network with a browser application running on a client computing device to provide the browser application access to the first application, and
a tagging module configured to interface over a communication connector with a second application running on a remote computing device, the second application being configured to process data stored in a database on the remote computing device, wherein
the service layer receives requests for the data from the first application via the browser application running on the client device and provides the requested data from the database on the remote computing device, and
the tagging module is configured to tag a record of the data in response to tag requests from the first application via the browser application, wherein the record of the data is tagged by generating an item reference to the record to point to a row in a table of the database to enable a customized view of the data using the tagged data without altering the data in the database; and
a storage layer configured to store the item references.

2. The system of claim 1 wherein the service layer is configured to receive requests from the first application via the browser application running on the client computing device for the customized view of the data and to cause the customized view to be delivered for display within the browser application.

3. The system of claim 1 wherein the tagging module is configured to create a group for a collection of tagged data and the storage layer is configured to store the group.

4. The system of claim 1 wherein the tagging module is configured to allow multiple different users to access the customized view of the data using the tagged data.

5. The system of claim 1 wherein the storage layer comprises an in-memory database.

6. The system of claim 1 wherein the processor on the cloud computing device is arranged and configured to execute the instructions that, when executed, cause the processor to implement a query engine, wherein the query engine is configured to query the storage layer for item references to tagged data and to query the data in the database on the remote computing device in response to a single query from the first application via the browser application.

7. The system of claim 1 wherein the customized view of the data is created using the tagged data while maintaining an integrity of the data in the database on the remote computing device.

8. A computer-implemented method for tagging data including executing instructions stored on a non-transitory computer-readable storage medium, the method comprising:
interfacing over a network with a browser application running on a client computing device to provide the browser application access to a first application running on a cloud computing device;
interfacing over a communication connector with a second application running on a remote computing device, wherein the second application is configured to process data stored in a database on the remote computing device;
in response to receiving a tag request from the first application on the client device to tag a record in a database, creating an item reference to the record to point to a row in a table of the database to enable a customized view of the data using the tagged data without altering the data in the database; and
storing the item reference in a storage layer on the cloud computing device.

9. The computer-implemented method of claim 8 further comprising receiving requests from the first application via the browser application running on the client computing device for the customized view of the data and causing the customized view to be delivered for display within the browser application.

10. The computer-implemented method of claim 8 further comprising creating a group for a collection of tagged data and storing the group in the storage layer.

11. The computer-implemented method of claim 8 further comprising allowing multiple different users to access the customized view of the data using the tagged data.

12. The computer-implemented method of claim 8 wherein the storage layer comprises an in-memory database.

13. The computer-implemented method of claim 8 further comprising querying the storage layer for item references to tagged data and querying the data in the database on the remote computing device in response to a single query from the first application via the browser application.

14. A computer program product for tagging data, the computer program product being tangibly embodied on a non-transitory computer-readable storage medium and comprising instructions that, when executed by at least one computing device, are configured to cause the at least one computing device to:
- interface over a network with a browser application running on a client computing device to provide the browser application access to a first application running on a cloud computing device;
- interface over a communication connector with a second application running on a remote computing device, wherein the second application is configured to process data stored in a database on the remote computing device;
- in response to receiving a tag request from the first application on the client device to tag a record in a database, create an item reference to the record to point to a row in a table of the database to enable a customized view of the data using the tagged data without altering the data in the database; and
- store the item reference in a storage layer on the cloud computing device.

15. The computer program product of claim 14 further comprising instructions that, when executed by at least one computing device, are configured to cause the at least one computing device to receive requests from the first application via the browser application running on the client computing device for the customized view of the data and cause the customized view to be delivered for display within the browser application.

16. The computer program product of claim 14 further comprising instructions that, when executed by at least one computing device, are configured to cause the at least one computing device to create a group for a collection of tagged data and storing the group in the storage layer.

17. The computer program product of claim 14 further comprising instructions that, when executed by at least one computing device, are configured to cause the at least one computing device to allow multiple different users to access the customized view of the data using the tagged data.

18. The computer program product of claim 14 wherein the storage layer comprises an in-memory database.

19. The computer program product of claim 14 further comprising instructions that, when executed by at least one computing device, are configured to cause the at least one computing device to query the storage layer for item references to tagged data and query the data in the database on the remote computing device in response to a single query from the first application via the browser application.

20. The computer program product of claim 14 wherein the database comprises an in-memory database.

* * * * *